United States Patent [19]

Williams et al.

[11] Patent Number: 4,956,240

[45] Date of Patent: Sep. 11, 1990

[54] USE OF POLYSILOXANES CONTAINING AMINO GROUPS AS ADDITIVES IN COATINGS FOR PLASTICS

[75] Inventors: John L. Williams; Reinhold Dederichs, both of Leverkusen; Ottfried Schlak, Cologne; Karl H. Käsler, Bergisch-Gladbach; Ulrich Grigo, Kempen; Werner Nouverné, Krefeld, all of Fed. Rep. of Germany

[73] Assignee: Bayer Aktiengesellschaft, Leverkusen, Fed. Rep. of Germany

[21] Appl. No.: 301,205

[22] Filed: Jan. 24, 1989

[30] Foreign Application Priority Data

Feb. 6, 1988 [DE] Fed. Rep. of Germany ....... 3803628

[51] Int. Cl.$^5$ .............................................. B32B 27/00
[52] U.S. Cl. ................................ 428/423.7; 524/188; 525/440; 525/453; 525/460; 428/447; 428/423.1; 427/387

[58] Field of Search ................ 524/188; 525/460, 453, 525/440; 427/387; 428/423.1, 447, 423.7

[56] References Cited

U.S. PATENT DOCUMENTS 4,373,043  2/1983  Yagi et al. ............................ 524/188
4,722,951  2/1988  Yoshioka et al. .................... 524/188

OTHER PUBLICATIONS

Chemical Abstracts, No. 153762z, vol. 102, May 1985.

*Primary Examiner*—Melvyn I. Marquis
*Attorney, Agent, or Firm*—Joseph C. Gil; Thomas W. Roy

[57] ABSTRACT

The present invention relates to the use of polysiloxanes containing amino groups as additives for improving levelling and wetting of polyurethane-based coating compositions applied to plastic substrates. The present invention additionally relates to the coated plastic substrates.

22 Claims, No Drawings

USE OF POLYSILOXANES CONTAINING AMINO GROUPS AS ADDITIVES IN COATINGS FOR PLASTICS

BACKGROUND OF THE INVENTION

1. Field of the Invention

This invention relates to polysiloxanes containing amino groups as additives for improving levelling and wetting in polyurethane-based coatings for plastics.

2. Description of the Prior Art

Plastics, particularly thermoplasts, are being employed to an increasing extent in the automotive industry where they are used, for example, for the production of fenders, spoilers, as linings for exterior parts or the production of other body parts.

It is standard practice to provide these plastic components with a coating for reasons of design or protection. In this connection, it has been found that the wettability of the plastics with the one-component and two-component polyurethane lacquers (coatings) normally used is very limited. This is a particular disadvantage in the case of a multiple-coat lacquer finish wherein the first coat is a base coat based on a physically drying or chemically crosslinking polyurethane binder. The poor wetting of the plastics surface with the base coat, which in general is only very thinly applied, ultimately results in lacquer defects, such as for example pinholes or uneven, poorly levelled surfaces. These defects are attributable to the fact that the individual lacquer droplets of the base coat do not blend with one another on account of the poor wetting. In addition, there is a danger that areas of the substrate which have not been wetted with the base coat may come into contact with the surface coat with the result that the plastic substrate is attacked by strong solvents present in the surface coat.

It has now surprisingly been found that polysiloxanes containing amino groups are suitable as additives in coatings for plastics in order to eliminate the problems mentioned above in regard to wetting and levelling.

SUMMARY OF THE INVENTION

The present invention relates to the use of polysiloxanes containing amino groups as additives for improving levelling and wetting of polyurethane-based coating compositions applied to plastic substrates. The present invention additionally relates to the coated plastic substrates.

DETAILED DESCRIPTION OF THE INVENTION

The polysiloxanes containing amino groups to be used in accordance with the invention include polysiloxanes having a molecular weight of about 400 to 110,000, preferably about 1000 to 10,000 which are soluble in lacquer solvents and which generally contain about 0.01 to 6% by weight, preferably about 0.05 to 1% by weight of nitrogen in the form of primary, secondary or tertiary amino groups.

Polysiloxanes containing amino groups eminently suitable for use in accordance with the invention include those having structural units corresponding to formulae I to VI:

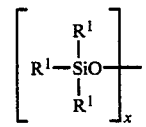

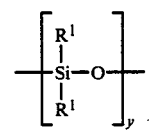

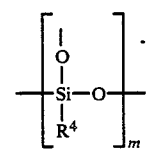

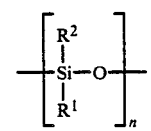

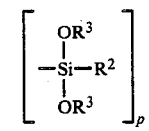

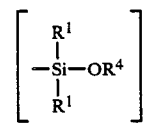

In formulae I to VI above, $R^1$ independently of each other represent alkyl groups containing 1 to 6 carbon atoms, vinyl groups or phenyl groups, $R^2$ represents an amino-group-containing alkyl or aryl radical containing primary, secondary or tertiary amino groups and having a total of 2 to 20 carbon atoms, $R^3$ represents alkyl groups containing from 1 to 6 carbon atoms, $R^4$ represents $C_1$–$C_6$ alkyl groups, phenyl groups and/or aminoalkyl groups containing 2 to 20 carbon atoms, and the individual structural units on a statistical average are present in the number represented by the indices x, y, m, n, p and q per molecule, m, q and x being the same or different and representing whole or (on a statistical average) fractional numbers of 0 to 5, the sum of m+n+p being a whole number or (on a statistical average) fractional number of 1 to 20 and y representing a whole or (on a statistical average) fractional number of 10 to 1400, provided that the nature of the substituents and the values of the indices are selected within the ranges mentioned in such a way as to produce the abovementioned values in regard to the molecular weight and nitrogen content of the polysiloxanes.

In these formulae, $R^1$ preferably represent methyl groups, $R^2$ preferably represents $C_2$–$C_7$ aminoalkyl radicals,
$R^3$ preferably represents methyl and/or ethyl groups,
$R^4$ preferably represents $C_1$–$C_2$ alkyl groups or $C_2$–$C_6$ aminoalkyl groups.

Other preferred polysiloxanes containing amino groups are those in which the sum of $m+n+p$ is a whole or fractional number of 2 to 10 and y is a whole or fractional number of 20 to 800.

Particularly suitable polysiloxanes containing amino groups are those corresponding to formula VII

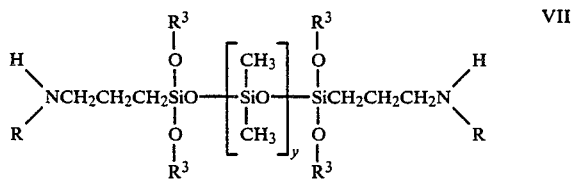

and those corresponding to formula VIII

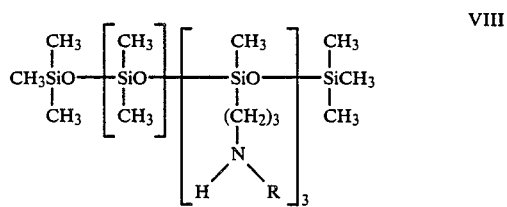

In these formulae.
R represents hydrogen, $C_1$–$C_4$ alkyl radicals and/or $C_2$–$C_6$ aminoalkyl radicals and
$R^3$ and y are as defined above.

The polysiloxanes containing amino groups which are suitable for use in accordance with the invention, are known. They may be prepared, for example, by reacting γ-aminopropyltrialkoxysilane with α,ω-hydroxy-terminated polydimethylsiloxanes or by equilibration of octamethyl cyclotetrasiloxane with amino-functional siloxanes. Other suitable methods of preparation are described, for example, in U.S. Pat. No. 2,909,549, herein incorporated by reference in its entirety.

The aminopolysiloxanes to be used in accordance with the invention are preferably used in a quantity of about 0.1 to 5% by weight, more preferably about 0.5 to by weight, based on the weight of the lacquer. However, these figures apply solely to a preferred procedure such that the additives according to the invention may also be used in smaller or larger quantities.

The use of the aminopolysiloxanes mentioned provides for the improvement of one-component and two-component polyurethane lacquers in regard to the levelling of the lacquers on plastics surfaces and in regard to the wetting of the plastics surfaces with the lacquer.

Suitable one-component polyurethane lacquers include those based on predominantly linear, fully reacted polyurethanes which are soluble in organic lacquer solvents, do not contain any reactive groups and, thus, dry by physical means (cf. for example Kunststoff-Handbuch 7 "Polyurethane", edited by Günter Oertel, Carl Hanser Verlag München/Wien (1983), page 551). Suitable physically drying lacquers of this type include those wherein the binder is based on a fully reacted, linear polyurethane prepared from (i) a polyester diol (ii) a chain-extending agent and (iii) a diisocyanate. Suitable polyester diols (i) for the production of such polyurethanes are, in particular, adipic acid/alkanediol/polyester diols having a molecular weight of about 600 to 3000. The alkanediols present in these polyester diols include butane-1,4-diol, hexane-1,6-diol, neopentyl glycol and mixtures thereof. Suitable chain-extending agents (ii) include diols of the type also used for the production of the polyester diols and also diamines such as hexamethylenediamine or isophoronediamine. Suitable diisocyanates (iii) for the production of the polyurethanes include known diisocyanates such as 4,4'-diisocyanatodiphenyl methane or isophorone diisocyanate. The polyurethanes are produced by known methods preferably using substantially equivalent quantities of the starting materials (NCO:H equivalent ratio=-about 0.9:1 to 1.1:1).

The two-component polyurethane lacquers suitable for use according to the invention include those wherein the binder is a two-component system based on a polyisocyanate component and a polyhydroxyl component. Two-component polyurethane lacquers such as these are described, for example, in the above-cited handbook on pages 541 to 544. The two component binder of these lacquers generally consists of a polyisocyanate component and a polyol component the amount of these components corresponding to a molar NCO/OH ratio of from about 0,5:1 to 2:1, preferably 0,8:1 to 1,5:1. Suitable polyisocyanates are the well-known "lacquer polyisocyanates" such as biuret-, isocyanurate- or urethane-modified derivatives of simple diisocyanates such as 2,4'-diisocyanato toluene or its mixtures with 2,6-diisocyanato toluene and especially 1,6-diisocyanato hexane which derivatives generally contain about 10 to 25 % by weight of isocyanate groups.

Suitable polyols are polyesterpolyols, polyetherpolyols or polyacrylate polyols.

The polyesterpolyols have generally a molecular weight of from 500 to 5000 and at least 2, preferably about 2 to 6 hydroxyl groups per molecule.

The polyetherpolyols have generally a molecular weight of from 1000 to 2000 and about 2 to 3 hydroxyl groups per molecule.

The acrylate polyols also have molecular weights of from about 500 to 5000 and contain generally from 1 to 12 percent by weight of hydroxyl groups.

The two-component lacquers may also contain the usual additives such as catalysts, pigments, solvents, levelling agents, fillers etc.

Also suitable, although less preferred, for use according to the invention are chemically hardening one-component lacquers which generally correspond to the two-component lacquers mentioned, except that the polyisocyanate component is blocked by blocking agents for isocyanate groups. Chemically hardening one-component lacquers such as these are described in the above-cited handbook, for example on pages 553 to 554.

In the case of chemically hardening two-component polyurethane lacquers containing free isocyanate groups, it is preferred to use aminopolysiloxanes wherein only tertiary amino groups are present. The use according to the invention is particularly suitable for the described improvement of physically drying one-component polyurethane lacquers.

In addition to the binders and the additives according to the invention, the lacquers may contain standard auxiliaries and additives such as known solvents and, optionally, pigments, fillers, levelling aids, antisedimenting agents and other additives known from lacquer technology.

The use according to the invention is designed with particular preference for the improvement of base coats for plastics based on the physically drying one-component binders mentioned above. These base coats are generally applied in thin layers (dry film thickness approximately 5 to 15 μm) to the plastic surfaces to be lacquered, followed after physical drying by the application of a surface coat, which is preferably based on a two-component polyurethane lacquer. The effect of using the aminopolysiloxanes essential to the invention in the base coat in accordance with the invention is that the plastic materials to be lacquered are satisfactorily wetted, so that lacquer finishes without any of the defects mentioned above are ultimately obtained.

However, the use of the polysiloxanes containing amino groups in accordance with the invention is not confined to the above-mentioned improvement of base coats. It is also suitable for improving the levelling and wetting power when surface-coat lacquers are applied to the plastic surfaces to be coated without any base coat. The surface-coat lacquers (as in the case of surface-coat lacquers applied to base coats) are preferably those based on the above-mentioned two-component polyurethane binders.

The lacquers are used with particular advantage for coating thermoplastic plastics. Plastics which may be lacquered in accordance with the invention include polycarbonates, polypropylenes, polysiloxanes, polyester plastics, polyurethanes and, in particular, polysiloxane-modified plastics such as polyorganosiloxane/polycarbonate block copolymers of the type described in DE-OS No. 33 47 071 (U.S. Pat. No. 4,569,970); alloys thereof with elastomeric polymers and, optionally, thermoplastic polyalkylene terephthalates of the type also described in DE-OS No. 33 47 071; mixtures thereof with polyisobutylenes; alloys thereof with styrene/maleic anhydride copolymers of the type described for example in EP-A-0 225 518; alloys thereof with special thermoplastic polyesters of the type described for example in DE-OS No. 36 04 475: and also thermoplastic polysiloxane/polyester(carbonate) block copolymers of the type described in DE-OS No. 33 44 911 (U.S. Pat. No. 4,681,922).

The wettability problem, which the present invention solves, arises in particular in the case of the above-mentioned siloxane-modified polycarbonates and alloys thereof with the other plastics because these plastics are distinguished by particularly poor wettability with standard coating materials. Accordingly, the present invention makes it possible in particular to overcome the difficulties associated with the coating of these plastics, especially when the plastics are lacquered by robot spraying. The use according to the invention makes it possible for the first time for plastics to be lacquered without difficulty by the robot spraying method which is now widely used in the automotive industry.

The invention is further illustrated but is not intended to be limited by the following examples in which all parts and percentages are by weight unless otherwise specified.

EXAMPLES

A plastic fender of a standard commercial polysiloxane-modified polycarbonate (Makroblend EC 900, a product of Bayer AG, Leverkusen) was lacquered in each of the following examples. Before lacquering, the fenders were pretreated in a three-stage "power-wash spray clean" in order completely to remove any residue. Thereafter, the surface tension of the fenders measured 25–35 mN/m. Immediately before the first coat (primer) was applied, ionized air was blown onto the fenders to remove any electrostatic charges.

EXAMPLE 1 (Comparison Example)

| Composition of the base coat (primer): | |
|---|---|
| Polyurethane resin[1] | 17.9 parts by weight |
| Solvent mixture[2] | 68.2 parts by weight |
| Titanium pigment (rutile) | 4.9 parts by weight |
| Talcum, very fine | 1.8 parts by weight |
| Chalk[3] | 1.8 parts by weight |
| Black pigment[4] | 2.4 parts by weight |
| Antisedimenting agent[5] | 3.0 parts by weight |

[1] A linear non-reactive polyurethane resin essential based on an adipic acid/butane diol-polyester of 2250 molecular weight, isophorone diisocyanate and isophorone diamine the molar ratio of all reactants corresponding to an NCO/H ratio of 1:1 (®Desmolac 4125, a product of Bayer AG, Leverkusen, Germany)
[2] Toluene/diacetone/isopropanol in a ratio by weight of 1:1:1
[3] ®Millicarb, a product of Omya, Cologne, Germany
[4] Carbon black pigment, 20% in methoxypropyl acetate
[5] ®Bentone 38, 10% suspension, a product of Kronos Titan GmbH, Leverkusen, Germany (1) A linear non-reactive polyurethane resin essential based on an adipic acid/butane diol-polyester of 2250 molecular weight, isophorone diisocyanate and isophorone diamine the molar ratio of all reactants corresponding to an NCO/H ratio of 1:1 ((R)Desmolac 4125, a product of Bayer AG, Leverkusen, Germany)
(2) Toluene/diacetone/isopropanol in a ratio by weight of 1:1:1
(3) Millicarb, a product of Omya, Cologne, Germany
(4) Carbon black pigment, 20 % in methoxypropyl acetate
(5) (R)Bentone 38, 10% suspension, a product of Kronos Titan GmbH, Leverkusen, Germany The above-mentioned primer was thinly applied (dry film thickness: 5 to 10 μm) by robot spraying to one of the above-mentioned plastic fenders.

Close inspection of the lacquered surface showed that wetting (blending of the lacquer droplets with one another) was inadequate, leading to defects when the surface-coat was applied including pinholes and uneven, poorly levelling surfaces.

EXAMPLE 2 (According to the invention)

Preparation of an additive according to the invention (polysiloxane containing amino groups):

935 g octamethyl cyclotetrasiloxane, 27.5 g γ-aminopropyltriethoxysilane and 37.5 g of a 10% solution of potassium hydroxide in ethanol were introduced into a 1-liter, three-necked flask equipped with a stirrer, thermometer and reflux condenser and stirred for 5 hours at 140° C. with removal of distillate. The mixture was then cooled to 80° C. and 4.4 g acetic acid were added. After stirring for one hour at 80° C., 3.7 g anhydrous soda were added, the pressure was reduced to 30–40 mbar and the mixture was distilled under this pressure up to a sump temperature of 140° C. The receiver was then changed, the pressure was reduced to 5–10 mbar and the mixture was heated for 1 hour at 140° C./5–10 mbar. After cooling to below 30° C. and equalizing the pressure with nitrogen, the mixture was filtered.

The resulting, clear and slightly yellowish aminopolysiloxane oil had the following characteristic data:

Viscosity: 344 m.Pas (Köppler, 23° C.)
Solids content: 95.1% (DIN 53 182)
Titration: 0.14 mmol NH$_2$/g ($\triangle$0.2% N)
Density: 0.975 g/ml at 23° C.

Example 1 was repeated with the exception that 1% by weight of the aminopolysiloxane oil was added to the primer.

Close inspection of the primer-coated plastic surface obtained showed that satisfactory blending of the lacquer droplets with one another (wetting) had occurred. The surface thus primed was satisfactorily prepared for further lacquering steps.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for coating a plastic substrate which comprises applying to a plastic substrate a polyurethane coating composition comprising
   (i) a polyurethane dissolved in an organic solvent and
   (ii) a polysiloxane containing amino groups in order to improve the levelling and wetting of said polyurethane coating composition on said plastic substrate.

2. The process of claim 1 wherein said polysiloxane contains structural units corresponding to formula I to VI

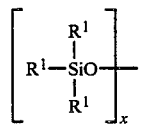 I

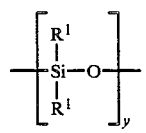 II

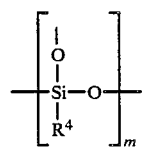 III

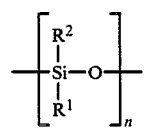 IV

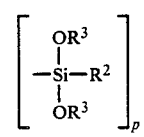 V

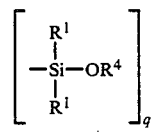 VI wherein
R$^1$ independently of each other represent an alkyl group containing 1 to 6 carbon atoms, a vinyl group or a phenyl group,
R$^2$ represents an amino group-containing alkyl or aryl radical containing primary, secondary or tertiary amino groups and a total of 2 to 20 carbon atoms,
R$^3$ represents an alkyl group containing 1 to 6 carbon atoms,
R$^4$ represents a C$_1$-C$_6$ alkyl radical, a phenyl group, a C$_2$-C$_{20}$ aminoalkyl group or mixtures there,
m, q and x are the same or different and represent whole or (on a statistical average) a fractional number from 0 to 5,
the sum of m+n+p being a whole or (on a statistical average) a fractional number of 1 to 20 and
y is a whole or (on a statistical average) a fractional number from 10 to 1400,
provided that the substituents and the values of the indices are selected to provide a molecular weight of the polysiloxane of about 400 to 110,000 and a nitrogen content in the form of primary, secondary or tertiary amino groups of about 0.01 to 6% by weight.

3. The process of claim 2 wherein said polysiloxane has a molecular weight of about 1000 to 10,000 and a nitrogen content of 0.05 to 1% by weight.

4. The process of claim 1 wherein said polyurethane coating composition comprises a physically drying, fully reacted polyurethane soluble in organic solvents.

5. The process of claim 2 wherein said polyurethane coating composition comprises a physically drying, fully reacted polyurethane soluble in organic solvents.

6. The process of claim 1 wherein said polyurethane coating composition comprises a two-component system based on a polyisocyanate component and a polyhydroxyl component.

7. The process of claim 1 wherein said polyurethane coating composition comprises a one-component system based on a polyisocyanate component containing blocked isocyanate groups and a polyhydroxyl component.

8. The process of claim 1 wherein said polysiloxane is present in a quantity of about 0.1 to 5% by weight, based on the weight of said polyurethane coating composition.

9. The process of claim 4 wherein said polysiloxane is present in a quantity of about 0.1 to 5% by weight, based on the weight of said polyurethane coating composition.

10. The process of claim 1 wherein said polysiloxane is present in an amount of about 0.5 to 2% by weight, based on the weight of said polyurethane coating composition.

11. A coated plastic which is prepared by a process which comprises applying to a plastic substrate a polyurethane coating composition comprising
   (i) a polyurethane dissolved in an organic solvent and
   (ii) a polysiloxane containing amino groups in order to improve the levelling and wetting of said polyurethane coating composition on said plastic substrate.

12. The coated substrate of claim 11 wherein said polysiloxane contains structural units corresponding to formula I to VI

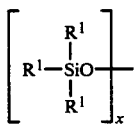  I

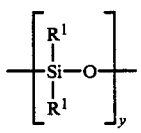  II

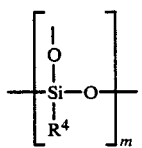  III

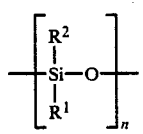  IV

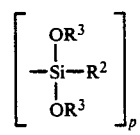  V

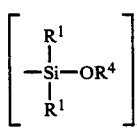  VI wherein
$R^1$ independently of each other represent an alkyl group containing 1 to 6 carbon atoms, a vinyl group or a phenyl group,
$R^2$ represents an amino group-containing alkyl or aryl radical containing primary, secondary or tertiary amino groups and a total of 2 to 20 carbon atoms,
$R^3$ represents an alkyl group containing 1 to 6 carbon atoms,
$R^4$ represents a $C_1$–$C_6$ alkyl radical, a phenyl group, a $C_2$–$C_{20}$ aminoalkyl group or mixtures there,
m, q and x are the same or different and represent whole or (on a statistical average) a fractional number from 0 to 5,
the sum of m+n+p being a whole or (on a statistical average) a fractional number of 1 to 20 and
y is a whole or (on a statistical average) a fractional number from 10 to 1400,
provided that the substituents and the values for the indices are selected to provide a molecular weight of the polysiloxane of about 400 to 110,000 and a nitrogen content in the form of primary, secondary or tertiary amino groups of about 0.01 to 6% by weight.

13. The coated substrate of claim 12 wherein said polysiloxane has a molecular weight of about 1000 to 10,000 and a nitrogen content of 0.05 to 1% by weight.

14. The coated substrate of claim 11 wherein said polyurethane coating composition comprises a physically drying, fully reacted polyurethane soluble in organic solvents.

15. The coated substrate of claim 12 wherein said polyurethane coating composition comprises a physically drying, fully reacted polyurethane soluble in organic solvents.

16. The coated substrate of claim 11 wherein said polyurethane coating composition comprises a two-component system based on a polyisocyanate component and a polyhydroxyl component.

17. The coated substrate of claim 11 wherein said polyurethane coating composition comprises a one-component system based on a polyisocyanate component containing blocked isocyanate groups and a polyhydroxyl component.

18. The coated substrate of claim 11 wherein said polysiloxane is present in a quantity of about 0.1 to 5% by weight, based on the weight of said polyurethane coating composition.

19. The coated substrate of claim 14 wherein said polysiloxane is present in a quantity of about 0.1 to 5% by weight, based on the weight of said polyurethane coating composition.

20. The coated substrate of claim 11 wherein said polysiloxane is present in an amount of about 0.5 by weight, based on the weight of said polyurethane coating composition.

21. The process of claim 1 wherein said plastic substrate is a polysiloxane-modified polycarbonate.

22. The coated plastic of claim 11 wherein said plastic substrate is a polysiloxane-modified polycarbonate.

* * * * *